United States Patent [19]

Schellekens et al.

[11] Patent Number: 5,186,861
[45] Date of Patent: Feb. 16, 1993

[54] INTRINSICALLY CONDUCTIVE MOULDING COMPOUND

[75] Inventors: Ronald M. A. M. Schellekens, Maastricht; Hans K. Van Dijk, Geleen; Marcus J. H. Bulters, Sittard, all of Netherlands

[73] Assignee: Stamicarbon B.V., Geleen, Netherlands

[21] Appl. No.: 643,590

[22] Filed: Jan. 22, 1991

[30] Foreign Application Priority Data

Jan. 24, 1990 [NL] Netherlands .................. 9000167
Feb. 10, 1990 [NL] Netherlands .................. 9000321

[51] Int. Cl.$^5$ .............................................. H01B 1/00
[52] U.S. Cl. ................................. 252/500; 252/518; 528/422
[58] Field of Search ............... 252/500, 518; 528/422

[56] References Cited

U.S. PATENT DOCUMENTS

| | | | |
|---|---|---|---|
| 4,604,427 | 8/1986 | Roberts et al. | 252/500 |
| 4,705,645 | 11/1987 | Lee et al. | 252/500 |
| 4,769,115 | 9/1988 | Satoh et al. | 252/500 |
| 4,828,756 | 5/1989 | Benton et al. | 252/500 |

FOREIGN PATENT DOCUMENTS 0350166  1/1990  European Pat. Off. ............ 252/500

OTHER PUBLICATIONS

Tammann, et al., Z. Anorg. U. Allg. Chem., Bd 162, pp. 1-16 (1927).

*Primary Examiner*—Karl Group
*Assistant Examiner*—Anthony J. Green
*Attorney, Agent, or Firm*—Cushman, Darby & Cushman

[57] ABSTRACT

The invention relates to a process for the preparation of an intrinsically conductive moulding compound obtained by in situ polymerization of monomers which form an intrinsically conductive polymer after polymerization, in the presence of a matrix polymer and a catalyst, the matrix polymer being dissolved in an essentially solvent free monomer, after which the solution obtained is brought into the desired form and the monomers are polymerized in situ in the presence of a catalyst.

Moulding compounds obtained with the process accordingly to the invention can be used in batteries electronic components (diodes, transistors), electrical wiring, coatings and in EMI-shielding attributes.

7 Claims, No Drawings

INTRINSICALLY CONDUCTIVE MOULDING COMPOUND

The invention relates to a process for the preparation of an intrinsically conductive moulding compound obtained by in situ polymerization of monomers which form an intrinsically conductive polymer after polymerization, in the presence of a matrix polymer and a catalyst.

Such a process is known from EP-A-314311. In the process according to this patent specification a thermoplastic matrix polymer is dissolved in a solvent, after which the solution is brought into a desired form and then gelled. Next, acetylene gas and a catalyst solution are added. The acetylene is polymerized to polyacetylene, following which an intrinsically conductive moulding compound is obtained after doping. The moulding compound has to be subjected to several additional treatments, for instance for removal of the solvent and the catalyst.

A drawback of the process as described in EP-A-314311 is the use of large quantities of solvent for the matrix polymer. This solvent, for instance decalin, has to be removed from the ultimate moulding compound with an extra treatment. The solvent thus has an adverse effect on the speed of the manufacturing process.

The object of the invention is to provide a process for the preparation of an intrinsically conductive moulding compound which possesses good conductive properties in combination with excellent dimensional stability, in which no separate solvent for the matrix polymer is used.

The process according to the invention is characterized in that the matrix polymer is dissolved in an essentially solvent free monomer, after which the solution obtained is brought into the desired form and the monomers are polymerized in situ in the presence of a catalyst.

By an essentially solvent free monomer is meant a liquid in which more than 90 wt. % monomers and/or oligomers is present, preferably more than 95 wt. %, more in particular more than 98 wt. %.

The invention is particularly effective if the monomers, which will form an intrinsically conductive polymer after polymerization, are chosen from the group: pyrrole, thiophene, benzene, furan, aniline and derivatives of these monomers. More in particular pyrrole and/or thiophene. Pyrrole and thiophene as monomers are already liquid at room temperature, which considerably simplifies processing with the process according to the invention.

The process according to the invention is not restricted to the use of one monomer, combinations of monomers being also possible. Combinations of pyrrole and substituted pyrrole are effective for instance. The essentially solvent free monomer phase preferably contains at least one heterocyclic aromatic.

Any polymer which is soluble in the essentially solvent free monomer can in principle be chosen as matrix polymer. The matrix polymer is required in order to effectuate the shaping of an intrinsically conductive moulding compound. Moreover, the coherence of the moulding compound is highly improved. Examples of suitable matrix polymers are: poly(vinyl alcohol); polyethylene, for instance UHMWPE (ultrahigh molecular weight polyethylene); poly(ethylene oxide); poly(vinyl acetate); polystyrene and the like. Mixtures of these polymers are also suitable. The molecular weight depends on the chosen matrix polymer and the application, but is preferably at least 100,000 ($M_W$). In particular at least 500,000, more in particular at least 1,000,000 g/mol.

The quantity of matrix polymer added in parts by weight preferably is less than the quantity of monomers. By preference the quantity of matrix polymer is less than 40% of the quantity of monomers. In particular less than 25%. Higher concentrations of matrix polymer may result in lower conductivity of the ultimate moulding compound.

An important parameter for the optimum concentration of the matrix polymer is the molecular weight ($M_W$) and the degree of branching of the matrix polymer. If the matrix polymer is high molecular (for instance $>1,000$ kg/mol) and linear, concentrations of 0.2 wt. % are already sufficient. If the matrix polymer is high molecular but branched, the optimum concentration will be more than 2 wt. %. By preference a high molecular, substantially unbranched matrix polymer is used.

The quantity of matrix polymer is also dependent on the desired final product. If a moulding compound is wanted, with a surface that is free during the processing, then the quantity of added matrix polymer will depend on the processability of the solution. Examples of such moulding compounds are fibers, tapes, sheets, films and the like. The processability of the mixture obtained after addition of a catalyst will have to be sufficient to allow of manufacture of a wire of at least 5 mm at a stretching rate of 500 mm/min. Preferably 7 mm, more in particular 10 mm. Determination of the processability in such a way is described in Tammann G., Tampke R., Z. Anorg. Allg. Chemie, Bd. 162 (1927), pp. 1-16.

If desired, polymers other than the matrix polymer, ionomers and/or fillers may be added to the essentially solvent free monomer up to a concentration of 60 wt. %. The addition may be effected prior to, during or after dissolving of the matrix polymer in the essentially solvent free monomer. Polymers to be added are for instance elastomers, like, for example EPDM-rubbers; ionomers to be added are for instance copolymers of ethylene and methacrylic acid. Such ionomers are preferably added if the desired final product is a film. Examples of fillers to be added are talcum, kaolin, wollastonite, glass.

Other additives, which are allowed to be added to the essentially solvent free monomer (up to 60 wt. %), are, for instance, flameproofing agents or flame retardants, pigments, antioxidation agents, stabilizing agents and the like.

The catalyst added for initiation of the polymerization preferably is a salt comprising a transition metal, in particular Fe, Co, Ru, Cu or Sn, and a halogen. Particularly effective is an iron(III)chloride solution in water or tin(IV)chloride. If a catalyst solution is used, a quantity of matrix polymer may be mixed with the catalyst solution prior to addition of the catalyst solution in order to enhance the miscibility of the catalyst solution with the monomer mixture.

The catalyst is preferably added during or after the shaping of the mixture. However, it is also possible to block the catalyst, so that a latent catalyst is obtained, which is added prior to the shaping and becomes active after deblocking. The catalyst is preferably added in an excess quantity.

It has been found that the process according to the invention provides a moulding compound which possesses very good conductive properties. Using the process according to the invention makes it possible to produce moulding compounds with a conductivity of at least 0.1 S/cm. The method according to the invention lends itself eminently for continuous manufacture of fibers and films. With the process according to the invention, moulding compounds are very easy to handle for stretching during moulding. Such moulding compounds are by preference additionally afterstretched, which can give improved mechanical and conductive properties as well as improved dimensional stability. Working without a separate solvent for the matrix polymer means that the number of required processing steps is reduced.

After forming of the end product and polymerization of the monomer mixture, catalyst residues can be removed by extraction if desired. It is also possible, in addition, to deform, for instance stretch, the end product mechanically before or after extraction, which can give improved mechanical and conductive properties.

Depending on the intrinsically conductive polymer obtained, the process according to the invention may be extended with a doping step after polymerization. The doping may be either oxidative or reductive, with utilization of known doping reagents and techniques, which are summarized in the 'Handbook of conducting polymers', by T. A. Skotheim (Marcel Dekker Inc., New York, USA (1986)).

A preferred embodiment of the process according to the invention is characterized in that (a) a matrix polymer is dissolved in the monomer, the quantity of matrix polymer relative to the monomer being at most 95 wt. %;

(b) the mixture obtained is then brought into the desired form;

(c) the monomers are polymerized in the presence of a catalyst, consisting of a salt of a halogen and a transition metal;

(d) this is followed by a doping step, if desired, after which an intrinsically conductive moulding compound is obtained.

The process according to the invention is highly suitable for continuous manufacture of a fiber. To that end, a solution of the matrix polymer in the monomer mixture and a catalyst are brought together in a very short mixing time (for example < 5 seconds), after which a fiber is continuously spun from the solution. For the manufacture of a highly conductive fiber, minimum quantities of matrix polymer are used by preference. More in particular less than 15 parts by wt. to 100 parts by wt. monomer.

The conductive properties of a formed end product can be determined by means of so-called four-point measurement. This method is completely described in EP-A-0314311 and in H. H. Wieder, Laboratory Notes on Electrical and Galvanomagnetic Measurements. With this method the specific conductivity is measured:

$\sigma = L/A * 1/R$, in which $\sigma$ = specific conductivity, S/cm;
L = distance between two inner electrodes, in cm;
R = resistance (= V/I), in ohm, and
A = cross-sectional surface, in cm$^2$.

Polyacetylene conducts very well ($\sigma$ 1,5 × 10$^5$ s/cm), but is not commercially practicable owing to the high thermal instability of the polymer. Polypyrrole and polythiophene are less conductive (0.1-100 S/cm) but are very stable, while their conductivity is sufficient for many kinds of applications.

Moulding compounds obtained with the process according to the invention can be used in batteries, electronic components (diodes, transistors), electrical wiring, coatings and in EMI-shielding attributes.

The process according to the invention will be elucidated with the following examples, without being restricted thereto.

EXAMPLE I (A) 10 g polyvinyl acetate (M$_V$ 1,100,000 g/mol) was dissolved at room temperature in 100 ml liquid pyrrole (Merck), which before use had been purified once again by means of vacuum distillation. The dissolving took place with continuous stirring. The polymer concentration of the obtained solution (A) was 9.4 wt. %.

(B) A bar (chromium/nickel, diameter 0.2 mm) was stuck into 40 ml of the solution A to a depth of 0.5 mm. With a constant speed of 500 mm/min the bar was subsequently drawn out of the solution. The wire broke at a length (i.e. the distance between the tip of the bar and the solution) of 90 mm.

(C) Fibers were spun from a part of the solution A. To that end the solution was introduced into a cylinder. By means of a piston coupled to a motor with a variable speed of rotation the solution was pressed through a capillary (diameter 0,5 mm) with a flow rate of 130 ml/h, at a temperature of 21° C. It appeared to be possible to wind the spun filament onto a bobbin with winding rates between 3.6 and 54 m/min. The distance between the spinning capillary and the bobbin was 15 cm.

(D) A second solution (B) was obtained by dissolving 90 g FeCl$_3$. 6 H$_2$O in 100 ml water at room temperature. With a spreading knife (opening 0.5 mm) 28.2 g of solution A was spread out on a Mylar ® film (polyethylene/terephthalate film). A liquid film of 0.5 * 50 * 50 mm was obtained. The liquid film was immediately submerged in 38 ml of solution B. The temperature was 21° C. The originally transparent film rapidly turned black, indicating the formation of polypyrrole.

After 60 minutes the dimensions of the coherently black film obtained still were 0.5 * 50 * 50 mm. The film was washed with ethanol and then with water and dried. The conductivity of the film determined by means of four-point measurement, was 1.5 S/cm.

EXAMPLES II-IV

The procedure of example ID was repeated, but with varying residence time of the liquid film in solution B. The results are summarized in table 1.

TABLE 1

| Examples | Residence time (min.) | Specific conductivity (S/cm) |
|---|---|---|
| II | 10 | 1.4 |
| III | 5 | 1.1 |
| IV | 1 | 1.3 |

These examples illustrate, that with the process according to the invention intrinsically conductive moulding compounds, which possess good conductive properties, can be obtained. These moulding compounds also have excellent dimensional stability.

We claim:

1. A process for preparing an intrinsically conductive moulding compound comprising the steps of:
   (a) dissolving a matrix polymer in an essentially solvent free monomer chosen from the group consisting of furan, pyrrole, benzene, aniline and derivatives thereof to form a solution;
   (b) shaping said solution of step (a) into a form; and
   (c) polymerizing said monomer of step (a) shaped in said form of step (b) in situ in the presence of a catalyst.

2. Process according to claim 1 wherein matrix polymer is added in an amount that is less than the amount of monomer.

3. Process according to claim 1, wherein the catalyst consists of a salt of a halogen and a transition metal.

4. Process according to claim 1, wherein the polymerization of the monomer is followed by a doping step.

5. Process according to claim 1 wherein, from the solution of the matrix polymer in the essentially solvent free monomer, after addition of a catalyst, a filament of at least 5 mm is spun with a drawing rate of 500 mm/min.

6. Process according to claim 1, wherein matrix polymer has a molecular weight ($M_w$) of at least 100,000 g/mole.

7. Process according to claim 6 wherein the matrix polymer is linear.

* * * * *